(12) United States Patent
Strike et al.

(10) Patent No.: US 7,889,977 B2
(45) Date of Patent: Feb. 15, 2011

(54) SINGLE OUTPUT H-BRIDGE DRIVE

(75) Inventors: Nigel Strike, Phoenix, AZ (US); Eric Hardt, Mesa, AZ (US)

(73) Assignee: Minebea Co., Ltd. (JP)

( * ) Notice: Subject to any disclaimer, the term of this patent is extended or adjusted under 35 U.S.C. 154(b) by 578 days.

(21) Appl. No.: 11/958,628

(22) Filed: Dec. 18, 2007

(65) Prior Publication Data

US 2009/0154905 A1   Jun. 18, 2009

(51) Int. Cl.
  *H02P 7/06*   (2006.01)
(52) U.S. Cl. .................. 388/804; 388/811; 318/571; 318/400.21
(58) Field of Classification Search ............. 318/571, 318/400.21, 45, 78; 388/811, 804
See application file for complete search history.

(56) References Cited

U.S. PATENT DOCUMENTS

| 6,140,931 | A  | * | 10/2000 | Yamane et al. ........... 340/686.6 |
| 6,611,117 | B1 |   | 8/2003  | Hardt |
| 7,002,311 | B2 |   | 2/2006  | Strike |

* cited by examiner

*Primary Examiner*—Karen Masih
(74) *Attorney, Agent, or Firm*—Kilpatrick Townsend & Stockton LLP

(57) ABSTRACT

Disclosed is a drive circuit for generating the drive current used to energize the windings of a motor. The drive circuit includes a data processing unit that produces two outputs used to control an H-bridge and generation of the drive current. One output, a commutation signal, controls the timing of generation of drive current. The drive current in turn is determined based on the other output, a speed signal. The speed signal waveform includes blanking portions to avoid occurrences of shoot through in the H-bridge.

24 Claims, 5 Drawing Sheets

SINGLE OUTPUT H-BRIDGE DRIVE

BACKGROUND OF THE INVENTION

The present invention relates generally to electric motors and in particular to the drive circuitry for providing drive current to DC (direct current) motors.

A conventional brushless DC motor typically includes a stator comprising a set of windings ("stator windings") and a rotor comprising a set of permanent magnets. A position detector provides an indication of the rotational position of the rotor; e.g., a Hall effect device is typically used, though other position detection techniques such as optical detection can be used.

It is conventionally known that when the stator windings are properly energized by driving currents of electricity through them, the resulting attractive and repulsive forces between the poles of the rotor and the energized coils will cause the rotor to rotate. By properly synchronizing changes in the direction of the driving currents through the stator windings, sustained rotation of the rotor can be achieved. The timing of the changes to the driving current is based on the rotor position.

The energizing of the stator windings is referred to as "commutation," and occurs in periodic fashion whereby the direction of the driving currents through the stator windings periodically reverse. Thus, for a brushless DC motor, a first commutation period involves driving current through the stator windings in a first direction, and then during a second commutation period the current that is driven through the stator windings is reversed. The circuitry used to provide the drive currents to the motor is typically referred to as the "drive circuit." Commonly owned U.S. Pat. No. 6,611,117 disclosed a novel method and apparatus whereby the drive circuit included a microcontroller used to produce the drive current, and is entirely incorporated herein by reference for all purposes.

BRIEF SUMMARY OF THE INVENTION

In accordance with the invention, a data processing unit outputs a speed control signal used by a switching device to produce drive current that can be applied to a motor to operate the motor at a speed determined by the speed control signal. The data processing unit further outputs a single control signal that serves to coordinate the switching of the drive current to one or more windings of a motor. Further in accordance with the present invention, an H-bridge circuit is used in the switching device, and the speed control signal is formed to prevent the occurrence of shoot through in the H-bridge circuit. Complete control over the switching circuit is thus accomplished by these two outputs of the data processing unit. The present invention provides efficient use of a data processing unit as a component of the drive circuit of a motor.

The circuitry that produces the drive current and provides it to the motor may be collectively referred to as the "drive circuitry." In accordance with the present invention, the drive circuitry further includes the data processing unit.

DETAILED DESCRIPTION OF THE INVENTION

Figure 1:
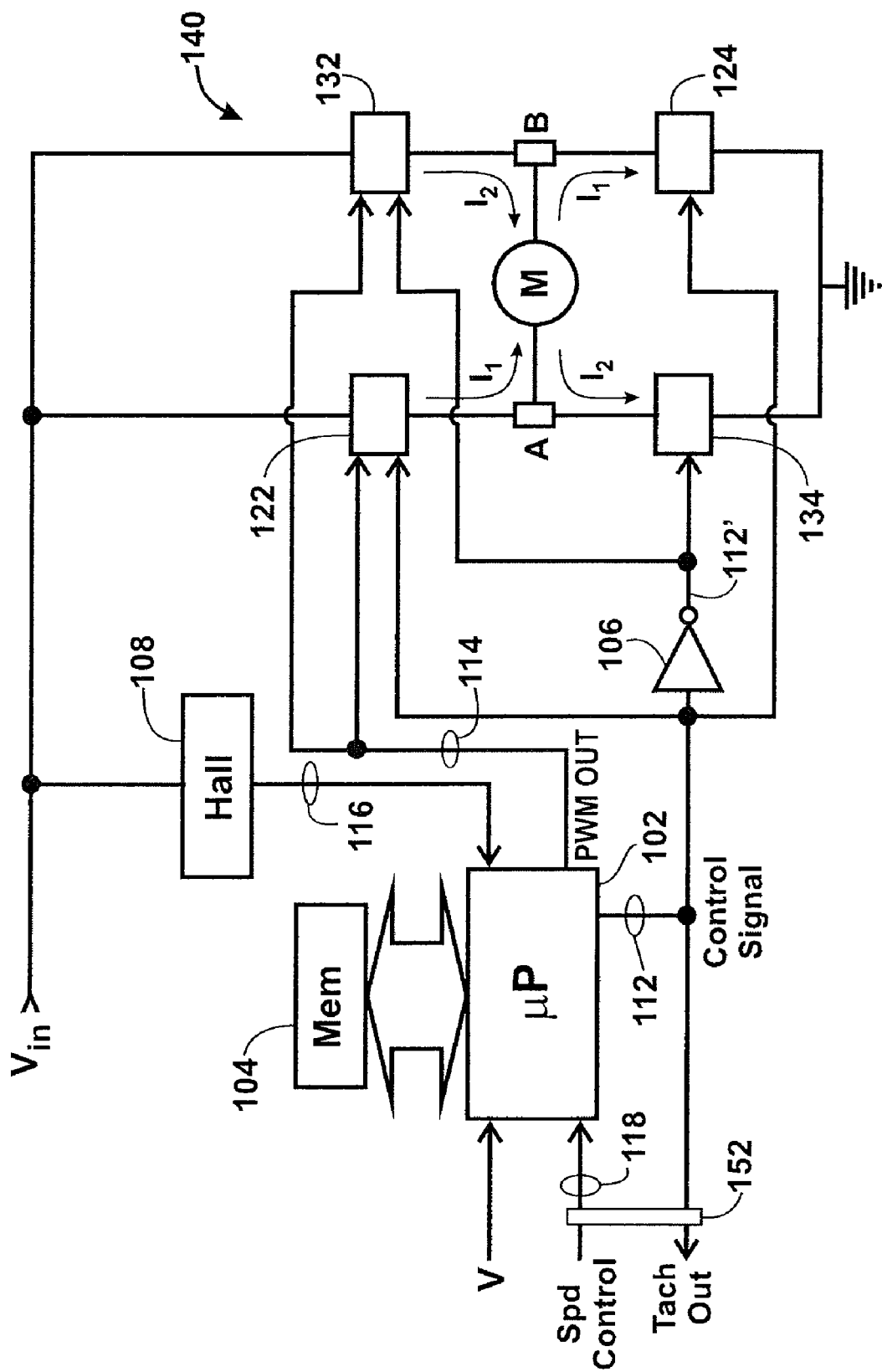
FIG. 1 is a high level generalized block diagram of an embodiment of the present invention.

FIG. 1 illustrates a generalized block diagram of components of a drive circuit according to the present invention for producing and delivering the drive current to the winding of a bipolar brushless DC motor M.

Figure 1A:
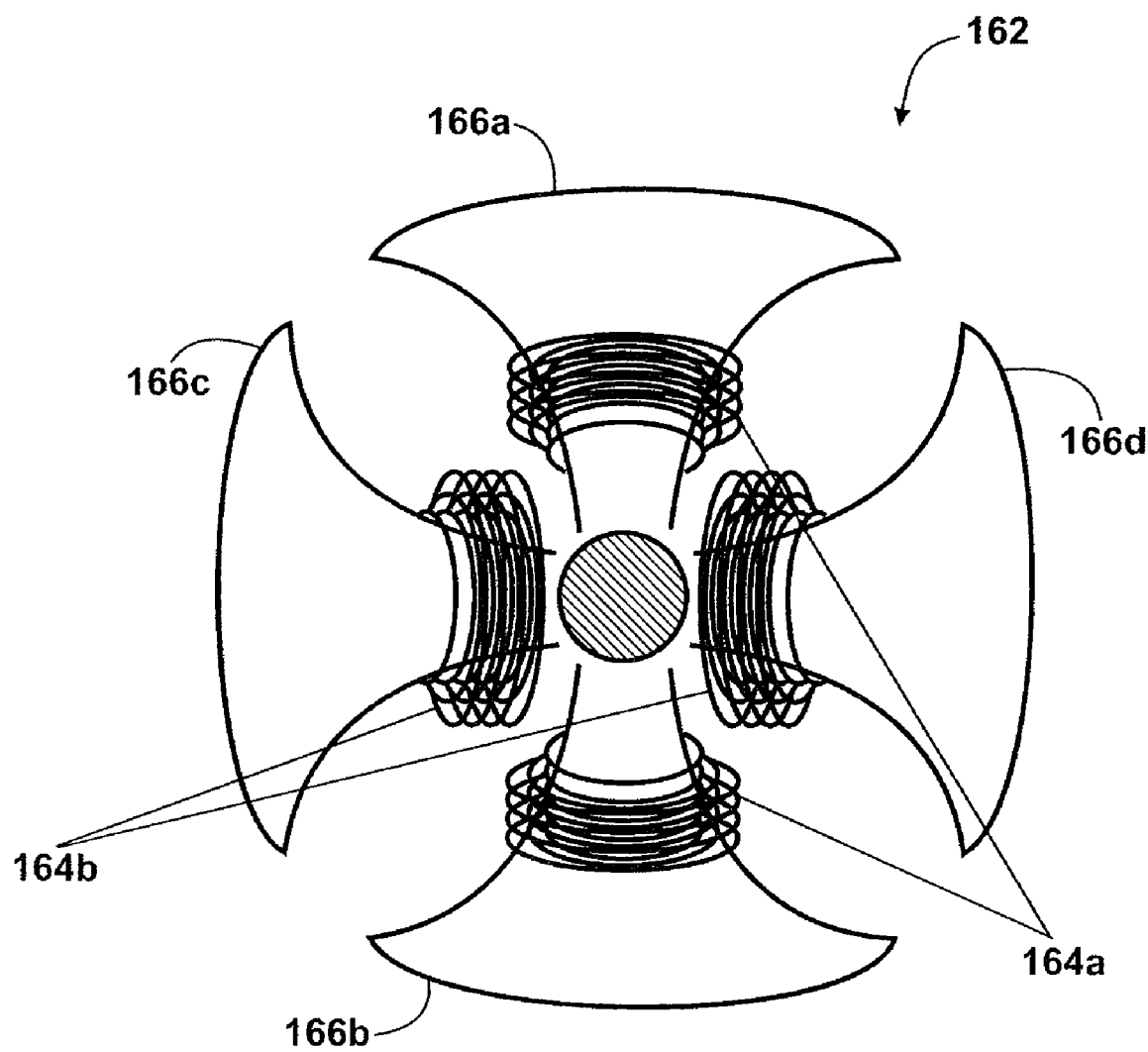
FIG. 1A is a schematic representation of a rotor of a bipolar motor.

FIG. 1A shows the stator winding 162 (4 tooth, 4 slot) for a bipolar motor. The particular bipolar configuration shown in the figure uses a four slot stator 162 with stator windings on each of the four teeth 166a-166d. It will be appreciated that the present invention can be used with other slot configurations.

In the stator winding 162 shown in FIG. 1A, commutation involves driving current through pairs of the stator windings in synchrony with the rotor. There is a single winding that wraps around all four stator teeth 166a-166d, but they are wound in alternating clockwise and counter-clockwise orientations. Thus, in a bipolar motor, the windings 164a, 164b shown in FIG. 1A represent two segments of a single winding. Thus, if segment 164a is wound around both teeth 166a, 166b in clockwise orientation, then segment 164b is wound in counterclockwise orientation around both teeth 166c, 166d. One end of winding is connected to terminal A in FIG. 1 and the other end of the winding is connected to terminal B. The term "bipolar" refers to this single coil configuration where current is passed through the coil winding in one direction at one time and then in the other direction at another time.

Returning to FIG. 1, a data processing unit 102 provides the signaling to control the motor M. The data processing unit 102 may be of any type programmable device familiar to those of ordinary skill in the controller arts, including but not limited to devices such as microcontrollers, general purpose CPUs, digital signal processors (DSP), dedicated logic such as application specific ICs (ASICs), gate arrays, etc., and combinations of such devices. Typically, a memory 104 is provided to store control programs and data. The memory 104 can be provided off-chip as a separate component, or can be on-chip with a CPU. A data/address bus component connects the data processing unit 102 with memory 104.

A suitable interface can be provided to allow for access to the data processing unit 102 by external devices, such as a PC or other user computer, or other electronic devices. For example, FIG. 1 illustrates the use of an I²C (inter integrated circuit) interface 152 which is an industry-known interface standard defined by Philips Semiconductor. The interface 152 can provide access for in-circuit programming of the data processing unit 102. The interface 152 can also be used to allow external electronics other than human users to interface with the data processing unit 102 for automated control, for example.

A rotor position sensor 108 provides the data processing unit 102 with information about the position of the rotor (not shown) of motor M. In the embodiment shown, the rotor position sensor 108 comprises a Hall device. The Hall device is placed near the rotor of motor M. As each pole of the rotor passes the Hall device, the magnetic field is detected and a signal is produced by the Hall device. This signal feeds into an input 116 of the data processing unit 102 and will be explained below serves as a timing basis for generating a control signal. The rotor position sensor 108 may include additional circuitry to produce a suitable signal that can be fed into the data processing unit 102, if necessary. For example, buffering may be needed to provide a suitable electrical interface between the Hall device and the data processing unit 102, and so on.

Another input to the data processing unit 102 is a speed setting signal 118. In the embodiment shown in FIG. 1, the speed setting signal 118 is a pulse width modulated (PWM) signal. The speed setting signal 118 can be in different forms, for example a voltage level. As will be explained in more detail below, this signal is gated to the motor M under control of data processing unit 102. In the embodiment shown in FIG. 1, the speed setting signal can be provided to the data processing unit 102 via the I²C interface 152, although it will be understood that, depending on a particular implementation, other interfacing techniques may be more suitable.

A switching circuit 140 comprises a switch pair 122 and 124, and another switch pair 132 and 134. Each switch pair is coupled to terminals A and B of motor M as shown in FIG. 1. A voltage $V_{in}$ serves as a drive voltage that feeds into inputs of switches 122 and 132. Outputs of switches 122 and 132 are respectively coupled to terminals A and B of motor M which are terminals of the stator coil of motor M. Terminals A and B are also coupled respectively to inputs of switches 134 and 124, while the outputs of switches 134 and 124 are coupled to ground potential.

Each switch 122, 124, 132, 134 has a control input for controlling the ON-OFF state of the switch. The ON-OFF state of switch pair 122, 124 are controlled by the same signal, while the ON-OFF state of switch pair 132, 134 are controlled by an inverted signal. The input to an inverter 106 is coupled to the control inputs of switches 122, 124, while the output the inverted 106 (the inverted signal) feeds to the control inputs of switches 132, 134. Thus, when switch pair 122, 124 is in the ON state (i.e., conducting state), switch pair 132, 134 will be in the OFF state (i.e., non-conducting state).

Each switch 122, 132 has an additional input, referred to as the speed control input. In the embodiment shown in FIG. 1, an output PWM signal 114 produced by the data processing unit 102 in accordance with the present invention serves as a speed control signal and is coupled to the switch 122 and to the switch 132. In each switch 122, 132, the speed control signal 114 modulates the drive voltage $V_{in}$ coming into the switch to produce a respective pulse-width modulated drive current $I_1$, $I_2$ to energize the motor winding, where the duty cycle of the drive current determines the speed of the motor.

When switch 122 (or 132) is in the ON state, the drive current $I_1$ (or $I_2$) is coupled to the output of switch 122 (or 132). For example, when the switch pair 122, 124 is in the conductive (ON) state, the switch pair 132, 134 will be in a non-conducting state. The drive current $I_1$ will be coupled through switch 122 to terminal A, flow through the winding (more generically, an electrical load) of motor M to terminal B, and flow to ground via switch 124. Conversely, when switch pair 132, 134 is in the ON state (i.e. conducting), switch pair 122, 124 will be in the OFF state. In this state, the drive signal current $I_2$ will be coupled through switch 132 to terminal B, flow through the stator coil of motor M to terminal A, and to ground via switch 134.

The data processing unit 102 produces a single control signal 112 that is used to control switch pair 122, 124 and switch pair 132, 134. The control signal 112 is provided to the input of inverter 106 to produce an inverted control signal 112'. The control signal 112 is coupled to control the switch pair 122, 124, while the inverted control signal 112' is coupled to control the switch pair 132, 134. Thus, the data processing unit 102 needs only produce the one control signal 112 in order to effect control over both switch pairs 122/124 and 132/134. As indicated in FIG. 1, the control signal 112 can also serve as a tachometer signal (TACH OUT) that can be coupled, via the I²C interface 152 for example, to some suitable external electronics.

Figure 2A:
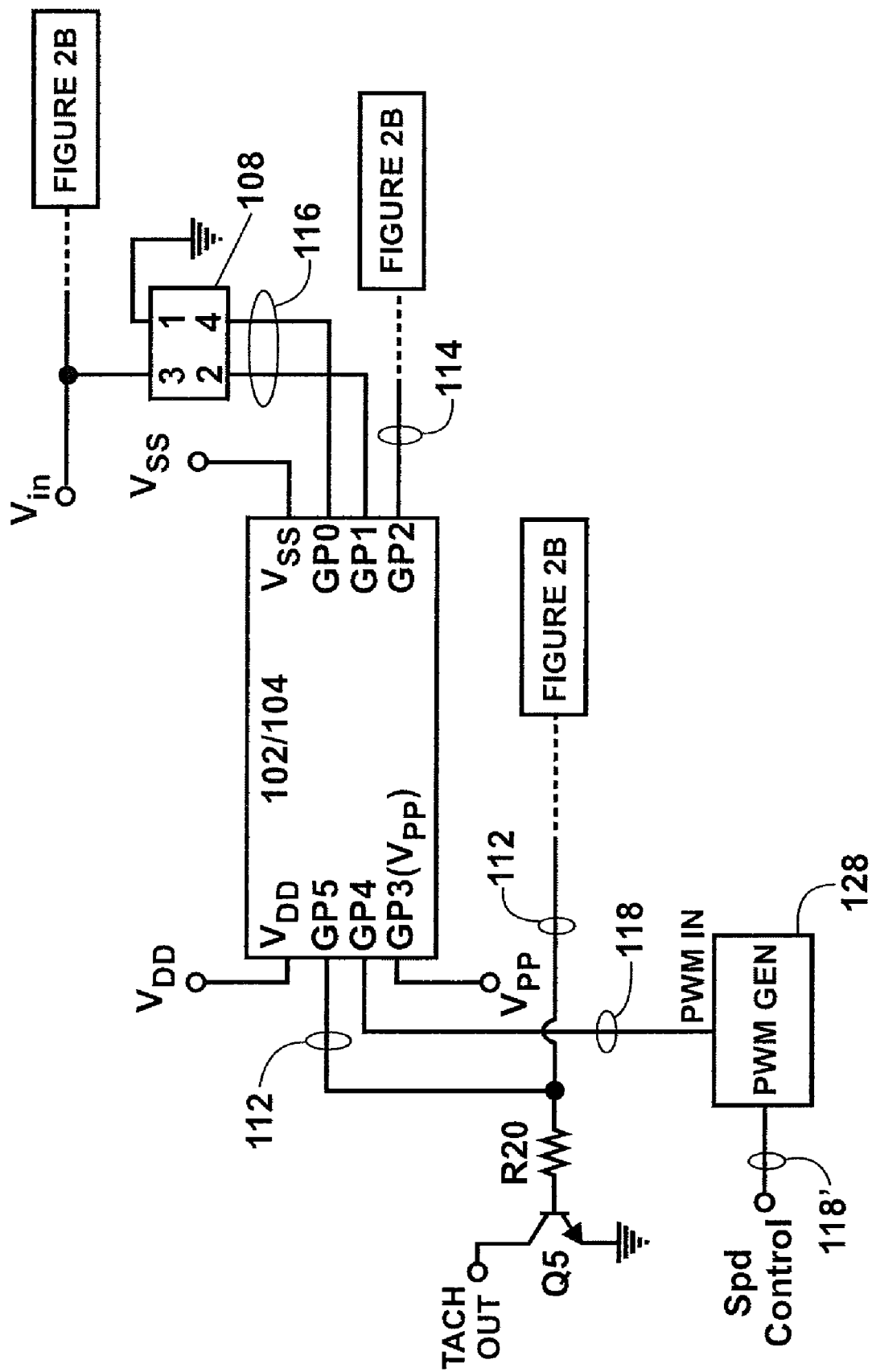
FIGS. 2A and 2B shows additional detail of the circuitry used in an implementation embodiment of the present invention.
Figure 2B:
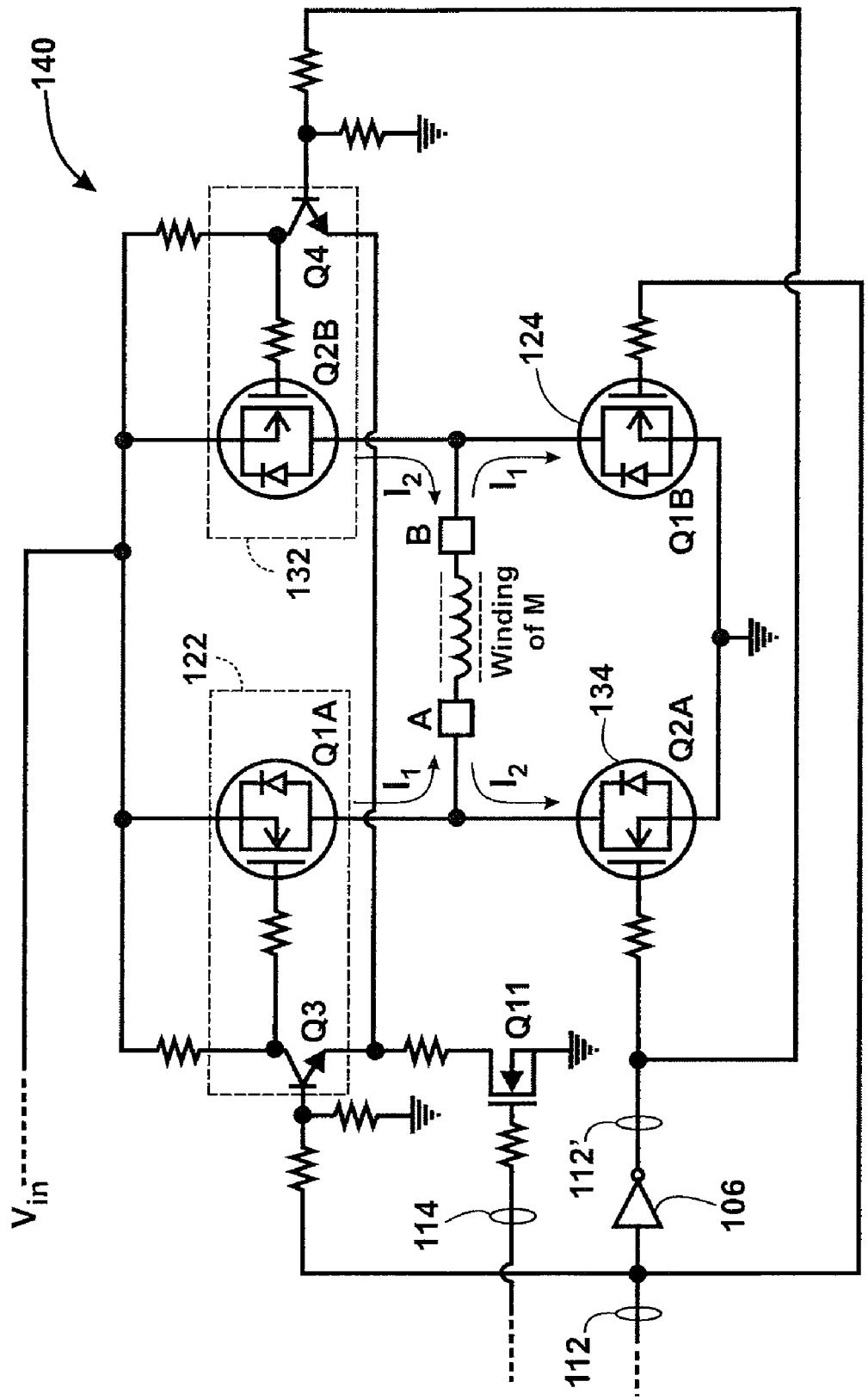

FIGS. 2A and 2B show details of a particular embodiment of the present invention. In a particular embodiment, the data processing unit 102 is an 8-pin flash, 8-bit CMOS microcontroller with 2K of on-board program flash memory (memory 104, FIG. 1). This microcontroller is produced and sold by Microchip Technology, Inc. under the part number PIC 12F683. It is understood that suitable software is provided to operate the microcontroller 102 in accordance with the teachings of the present invention.

The microcontroller 102 shown in FIG. 2A has six I/O pins, GP0-GP5. Suitable voltages $V_{DD}$, $V_{SS}$, and $V_{PP}$ (provided via pin GP3) are provided to the microcontroller 102. The remaining inputs to the microcontroller 102 will be discussed below in connection with the other elements illustrated in the figures.

In the particular embodiment of the present invention shown in FIG. 2A, the rotor position sensor 108 is a Hall element, produced and sold by Asahi Kasei EMD Corporation under the part number HW-101A-4T. Although it is not shown in the figures, it is commonly known that the Hall element 108 is located near the rotor, and generates electrical signals when exposed the rotating magnetic fields of the rotor. Two outputs 116 of the Hall element 108 are connected to pins GP0 and GP1 of the microcontroller 102 to provide information indicative of the position of the rotor as the Hall output signal changes. The Hall outputs 116 also provide an indication of the speed of rotation of the rotor by virtue of the rate of change of the Hall output signal.

In the particular embodiment of the present invention shown in FIG. 2A, an externally provided speed setting signal 118' feeds into the PWM generator 128. The external speed setting signal 118' will typically be provided by a human user via a suitable interface or a machine user via a suitable machine interface to specify a desired operating speed of the motor according the specific application in which the present invention is being used. The PWM generator 128 is of a conventionally known design and produces a suitable pulse width modulated signal that serves as the speed setting signal 118 that feeds into input GP4 of the microcontroller 102. As will be explained in more detail below, the PWM signal 118 is processed by the microcontroller 102 to produce the speed control signal 114 which is provided at pin GP2 of the microcontroller.

The other output of the microcontroller 102 is the control signal 112, output at pin GP5. The control signal 112 can be provided as an externally read tachometer signal (TACH OUT) via the interface circuit comprising transistor Q5 and resistor $R_{20}$. Transistor Q5 is produced and sold by Rohm Electronics under part number SST2222.

Discussion of signals 112 and 114 will continue in connection with FIG. 2B. The control signal 112 generated by the microcontroller 102 is the only signal generated by the microcontroller that is used to control the switching circuit 140. More specifically, the control signal 112 directly controls switches 122 and 124 of the switching circuit 140. The control signal 112 feeds into inverter 106 to produce inverted control signal 112' which controls switches 132 and 134 of the switching circuit 140.

As shown in the particular embodiment of FIG. 2B, the switch 122 of FIG. 1 comprises transistors Q3 and Q1A. The switch 132 comprises transistors Q4 and Q2B. Switches 124 and 134 respectively comprise transistors Q1B, Q2A. The configuration of transistors comprising switching circuit 140 shown in the figure is commonly referred to as an H-bridge circuit.

In the particular embodiment of the present invention shown in FIG. 2B, transistors Q1A, Q2B, Q1B, Q2A are MOSFET devices produced and sold by Sanyo Electric Co., Ltd. under the part number FW344. More specifically, transistors Q1A and Q2B are P-channel devices for sourcing current from drive voltage $V_{in}$, while transistors Q1B and Q2A are N-channel devices for sinking current. Transistors Q3 and Q4 are produced and sold by Rohm Electronics under part number SST2222.

The speed control signal 114 is coupled to the gate of transistor Q11, which in the particular embodiment shown in FIG. 2B is an FET device produced and sold by Toshiba Corporation under the part number SSM3K05FU. The speed control signal 114 is a pulse width modulated signal that modulates the drive voltage $V_{in}$ via transistors Q1A and Q2B to produce respective pulse width modulated drive currents $I_1$, $I_2$ used to energize the winding of motor M. As understood in the motor arts, the duty cycle of the pulse width modulate drive current determines how fast the rotor will spin.

When switches 122 and 124 are in the ON state by virtue of control signal 112 being HI, transistor Q3 of switch 122 is turned ON. A modulated current flow from $V_{in}$ to ground via transistor Q11 will result in accordance with the HI and LO pulses of the speed control signal 114. This modulated current in turn will modulate the gate voltage of MOSFET Q1A and cause Q1A to modulate the drive voltage $V_{in}$ across its gate and source terminals, also in accordance with the speed control signal 114, to produce a pulse modulated drive current $I_1$ that will flow from Q1A to the winding of motor M via terminal A. The transistor Q1B (switch 124) which is also turned ON by control signal 112 provides a path to ground for the drive current $I_1$.

Similarly, when switches 132 and 134 are in the ON state by virtue of inverted signal 112' being HI, transistor Q4 of switch 132 is turned ON. A modulated current flow from $V_{in}$ to ground via transistor Q11 will result in accordance with the HI and LO pulses of the speed control signal 114. The modulated current will in turn modulate the gate voltage of MOSFET Q2B and cause Q2B to modulate the drive voltage $V_{in}$ across its gate and source terminals, also in accordance with the speed control signal 114, to produce a pulse modulated drive current $I_2$ that will flow from Q2B to the winding of motor M via terminal B. The transistor Q2A (switch 134) which is also turned ON by inverted signal 112' provides a path to ground for the drive current $I_2$.

The control signal 112 alternately enables switch pair 122/124 and switch pair 132/134 to produce the drive current as described above thus energizing the winding, a process referred to as commutation. For this reason, the control signal 112 is also referred to as a commutation signal.

As mentioned above, the data processing unit 102 produces only one control signal 112 that is used to control switch pair 122, 124 and switch pair 132, 134. A particularly salient aspect of the present invention are the details of the waveform of the speed control signal 114 produced by the data processor 102. Briefly, the speed control signal 114 includes both pulse width modulated portions which are used to produce the drive current and "blanking periods" which are used to prevent the occurrence of shoot through events. This aspect of the present invention will be explained in greater detail below in connection with FIG. 3. The combination of signals 112 and 114 allows complete control over the H-bridge circuit of FIG. 1 and FIG. 2B with only two microcontroller output pins.

Figure 3:
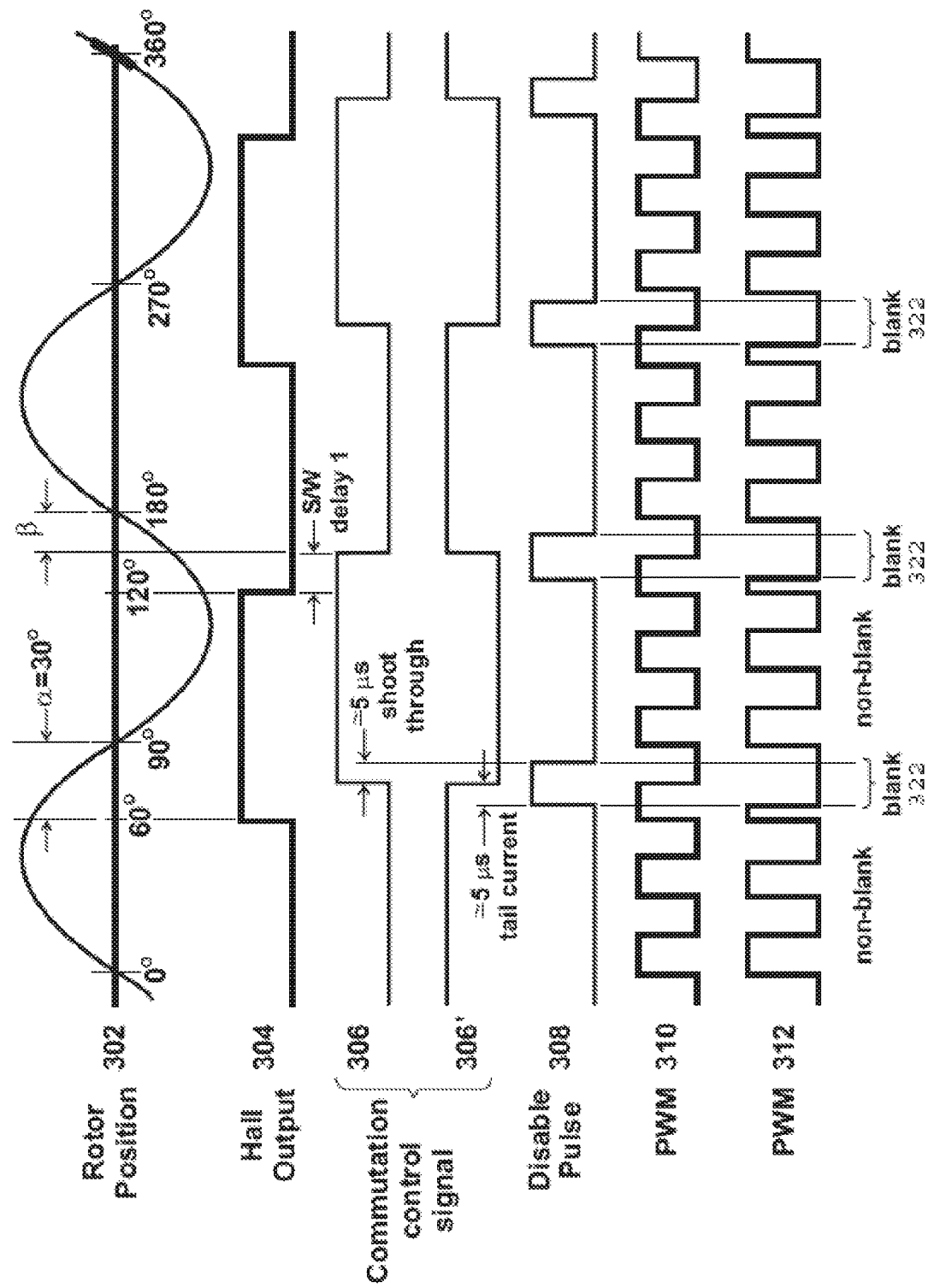
FIG. 3 shows waveforms in accordance with the present invention.

FIG. 3 illustrates waveforms relevant to the generation of the control signal 112 to control switching of switch pair 122, 124 and switch pair 132, 134, and the speed control signal 114.

The first waveform 302 shows the angular position of the rotor for one full turn of the rotor and is used as a reference for the subsequent waveforms illustrated in the figure. A portion of the waveform 302 in the neighborhood of the 360° position is emphasized to show the occurrence of back EMF in the winding.

The second waveform 304 represents the output 116 of the Hall sensor 108 which feeds into inputs pins GP0 and GP1 of the microcontroller 102. In the particular embodiment of the present invention, the Hall device 108 is mechanically advanced by an amount $\alpha°$. In a particular embodiment, the advancement is about 30°, keeping in mind that an over advance will prevent the motor from starting, and too little advance will not provide sufficient room for adjustment when delaying the commutation signal. There is, in general, a small range of advance values which will work for a given motor. Advancing the sensor in this manner is known in the art for the purpose of increasing operating efficiency of the motor. As a result of advancing the sensor, the position signal 116 (represented by waveform 304) from the Hall device 108 will indicate a rotor position that is offset from its actual position, say by 30°. This amount of advancement is much greater than is typical. However, software in the microcontroller 102 can adjust for the physical advancement of the sensor 108 and "shift" the advancement by a desired amount, which depends on the speed of the rotor, to obtain an optimized advancement for increases operating efficiency. The speed of the rotor is indicated by the frequency of the pulses in the waveform 304. These and other aspect of software-compensated advancement were taught in commonly owned U.S. Pat. No. 7,002,311, which is incorporated herein by reference in its entirety for all purposes.

A comparison of the sensor output 304 against the rotor position 302 illustrates the effect of the advancement. As the rotor turns from 0° to 90°, the sensor output logic transitions (in this case from LO to HI) when the rotor is at or near the 60° position, assuming 30° advancement of the sensor 108, thus indicating that the rotor is in the 90° position about 30° sooner than if the sensor had not been advanced. The sensor output 304 again transitions (HI to LO) as the rotor nears the 120° position.

The third and fourth waveforms 306, 306' respectively represent the control signal 112 produced by the microcontroller 102 (i.e., output signal at pin GP5) and the inverted control signal 112' output of inverter 106. As noted above, the microcontroller software can compensate for the advancement of the Hall device. Waveform 306 shown in FIG. 3 indicates a delay (delay 1) to delay the control signal output by the microcontroller 102. The control signal 112 is based on the rising and falling edges of the sensor signal and is delayed by an amount to compensate for the advanced position of the sensor 108 including an amount based on the speed of the rotor. The figure shows that as a result of the compensation (delay 1), the output signal 112 (waveform 306) indicates a Hall advancement of $\beta°$. The specific details of how much compensation to the advancement are not discussed herein as they are not relevant to the present invention, but are disclosed in U.S. Pat. No. 7,002,311.

Refer now to the sixth waveform 310. The sixth waveform 310 is the speed control signal 114 that is produced by the microcontroller 102 (i.e., output signal at pin GP2). The speed control signal 114 is a pulse width modulated (PWM) signal, the duty cycle of which is determined based on the speed setting signal 118 received by the microcontroller 102. The speed signal is generated by the microcontroller 102 having the desired duty cycle to drive the motor at the speed indicated by the speed setting signal 118. As discussed above, the speed control signal 114 controls transistors Q1A and Q2B to modulate the drive voltage $V_{in}$ across their respective source and gate terminals to produce a drive current.

The fifth waveform 308 represents disable pulses that are generated by the microcontroller 102. The control signal 112 and its inverted signal 112' control respective switch pairs 122/124 and 132/134. As can be seen the disable pulses are synchronized with transition edges of the control signal 112.

During the transitions of signal 112 between HI and LO, there will be small windows of time, on the order of 5 μS or so, where the signals 112 and 112' are both in the HI logic state. Consequently, when the speed control signal 114 modulates transistors Q1A and Q2A, the resulting drive currents will flow down the left-side transistors of the H-bridge (Q1A, Q2A) and down the right-side transistors (Q2B, Q1B). This condition is called shoot through where drive current (called shoot through current) is shorted to ground via the left-side and the right-side transistors.

The disable pulses 308 are generated and used internally by the microcontroller software to "disable" portions of the speed control signal 114 in synchrony with transitions of the control signal 112. As can been seen from the waveforms illustrated in FIG. 3, the width of the disable pulses is based at least on the rising and falling edges of the control signal 112. In FIG. 3, a portion of the of each disable pulse is about 5 μS in duration and begins at the transition edge of the control signal 112.

In a particular embodiment of the present invention, another portion of each disable pulse is provided to limit the tail current. Towards the end of a commutation cycle the current through the motor can increase significantly because the back EMF opposing the current flow reduces. This current is called "tail current". A high tail current causes two problems: (1) both the supply and the circuitry internal to the fan has to be designed to cope with these high currents; and (2) the stored energy in the winding is ½ I²L where I is the current flowing at switch off. The higher the tail current the higher the stored energy that the drive circuitry has to handle. The width of this portion of each disable pulse is about 5 μS in duration and is placed just before the transition edge of the control signal 112. This portion of the disable pulse serves to turn off the drive current a bit sooner to limit the tail current and thus the stress on the drive circuitry. Each disable pulse therefore spans a period of time just before the transition edge of the control signal 112 and a period of time after the transition edge.

The seventh waveform 312 is produced by combining the disable pulses 308 with the speed control signal 310. The disabling waveform 308 serves to create a blanking period 322 in the speed control signal 310. The truth table illustrated below represents this operation and can be readily implemented in the microcontroller 102. The resulting waveform 312 represents the resulting speed control signal that is provided on the pin GP2 of the microcontroller 102.

| TRUTH TABLE | | |
| --- | --- | --- |
| Waveform 5 | Waveform 6 | Waveform 7 |
| 0 | 0 | 0 |
| 0 | 1 | 1 |
| 1 | 0 | 0 |
| 1 | 1 | 0 |

In accordance with the present invention, the blanking periods 322 in the speed control signal 114 is synchronized with the brief period time during transitions between HI and LO states of the control signal 112 and inverted signal 112', thus preventing the occurrence of a shoot through condition that can result when both signals are in a HI logic state turning on the H-bridge transistors.

What is claimed is:

1. A motor drive circuit comprising:
   a data processor;
   a first output of the data processor outputting a control signal;
   a second output of the data processor outputting a speed signal; and
   an H-bridge circuit comprising a first switch pair and a second switch pair,
   the first output connected to control the first and second switch pairs with the control signal,
   wherein the first and second switch pairs, in accordance with the control signal, alternate producing a drive current, wherein the drive current is produced in accordance with the speed signal,
   the speed signal including blanking portions coincident with times when one switch pair turns on to produce drive current and the other switch pair turns off, wherein during the blanking portions of the speed signal neither the first switch pair nor the second switch pair produces drive current.

2. The circuit of claim 1 further comprising an inverter connected to the control signal to produce an inverted signal, the first switch pair controlled in accordance with the control signal, the second switch pair controlled in accordance with the inverted signal.

3. The circuit of claim 1 further comprising an input of the data processor configured to receive position information relating to the position of a rotor of a motor.

4. The circuit of claim 3 wherein the position information is an output of a Hall sensor disposed proximate the rotor.

5. The circuit of claim 1 wherein the speed signal is a time-varying signal, wherein the blanking portions are steady state portions of the speed signal.

6. A motor drive circuit comprising:
   a data processor, a first signal being output at a first output of the data processor and a second signal being output at a second output of the data processor; and
   first and second switched current generators producing a current in alternating fashion in response to transitions of the first signal, wherein one switched current generator is producing current,
   wherein the first and second switched current generators alternate producing current in synchrony with transitions of the first signal between first and second logic states,
   wherein the current that is produced is based on the second signal,
   wherein the second signal includes blanking portions synchronous with the transitions of the first signal,
   wherein during the blanking portions neither the first switched current generator nor the second switched current generator produces current.

7. The circuit of claim 6 wherein the second signal includes portions that comprise pulses, wherein the blanking portions of the second signal are absent any pulses.

8. The circuit of claim 6 wherein the transitions of the first signal occur based at least on the position of a rotor of the motor.

9. The circuit of claim 8 further comprising an input of the data processor coupled to receive a rotor position signal from the motor.

10. A drive circuit for a motor comprising:
a data processing unit;
a first output of the data processing unit to output a switch control signal based at least on the position of a rotor of the motor;
a second output of the data processing unit to output a speed signal; and
a switching circuit comprising an H-bridge circuit and operable to generate a drive current based on the speed signal, wherein the speed signal includes a blanking period during which time drive current is not generated by the switching circuit to avoid occurrence of shoot through in the H-bridge,
the first output in electrical communication with the switching circuit for switching control thereof by the switch control signal to cyclically switch the drive current between terminals of a coil winding of the motor, wherein the switch control signal is the only signal produced by the data processing unit for switching the drive current between the terminals of the coil winding of the motor.

11. The drive circuit of claim 10 wherein the blanking period in the speed signal coincides with occurrence of switching of the drive current between the terminals of the coil winding of the motor.

12. The drive circuit of claim 10 wherein the speed signal comprises a plurality of pulses, wherein the blanking periods of the speed signal are absent any such pulses.

13. The drive circuit of claim 10 further comprising an input of the data processing unit configured to receive position information relating to the position of the rotor, the switch control signal based at least on the position information.

14. The drive circuit of claim 10 further comprising a Hall sensor disposed proximate the motor and electrically coupled to an input of data processing unit to provide position information relating to the position of the rotor, the switch control signal based at least on the position information.

15. The drive circuit of claim 10 further comprising an I²C communication interface.

16. A method for driving an H-bridge circuit comprising:
outputting a switching signal from a first output of a data processing unit;
outputting a speed signal from a second output of the data processing unit; and
alternating the turning on of a first switch pair and a second switch pair of the H-bridge circuit to produce a drive current, wherein the control signal controls alternating turning on and turning off of the first and second switch pairs,
wherein the drive current is based at least on the speed signal,
wherein the speed signal includes blanking portions and non-blanking portions,
wherein the blanking portions coincide in time with times when the first switch pair or the second switch pair is turned on to produce drive current and the other switch pair is turned off,
wherein during blanking portions, neither the first switch pair nor the second switch pair produces drive current.

17. The method of claim 16 wherein the switching signal is the only signal from the data processing unit that is used to alternate turning on and turning off of the first and second switch pairs.

18. The method of claim 16 wherein the speed signal comprises pulses during the non-blanking portions, and the speed signal is absent pulses during the blanking portions.

19. The method of claim 16 further comprising applying the drive current to a DC motor and receiving position information of a rotor of the motor, wherein the switch switching signal is based at least on the position information.

20. The method of claim 16 further comprising applying the drive current to a DC motor; receiving position information of a rotor of a motor; and receiving speed setting information indicative of a rotational speed of the rotor, wherein the switching signal is based at least on the position information, wherein the speed signal is based at least on both the position information and the speed setting information.

21. The method of claim 20 wherein the position information based on output of a Hall sensor device disposed proximate the rotor.

22. A method for providing drive current to a direct current (DC) motor, the DC motor comprising a stator and a rotor, the method comprising steps of:
producing a position signal indicative of a position of the rotor;
providing the position signal to an input of a data processing device;
operating the data processing device to perform steps comprising:
producing a commutation signal at a first output of the data processing device based on the position signal; and
producing a speed signal at a second output of the data processing device, the speed signal including a blanking portion during which time the speed signal is in an OFF state;
providing the speed signal substantially at the same time to both a first switch circuit and a second switch circuit, the first and second switch circuits connected to the DC motor, each of the first and second switch circuits having an ON-OFF state;
producing an inverted commutation signal that is the inverse of the commutation signal;
providing the commutation signal to the first switch circuit substantially at the same time as providing the inverted commutation signal to the second switch circuit, whereby the ON-OFF state of the first switch circuit is opposite to the ON-OFF state of second switch circuit,
producing a drive current in the first switch circuit based on the speed signal when the first switch circuit is in an ON state, wherein the drive current is not produced during the blanking period; and
producing a drive current in the second switch circuit based on the speed signal when the second switch circuit is in the ON state, wherein the drive current is not produced during the blanking period;
wherein the first and second switch circuits change ON-OFF states at substantially the same time,
wherein the blanking period of the speed signal spans the period of time when the first and second switch circuits change ON-OFF states.

23. The method of claim 22 wherein the position signal is an output of a Hall sensor device.

24. The method of claim 22 further comprising the data processing device receiving a speed setting signal, wherein the speed signal is based at least on the speed setting signal.

* * * * *